(12) United States Patent
    Li

(10) Patent No.: US 12,267,402 B1
(45) Date of Patent: Apr. 1, 2025

(54) METADATA COMPRESSION FOR A SAAS SYSTEM

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/514,292

(22) Filed: Nov. 20, 2023

(51) Int. Cl.
    *H04L 67/561* (2022.01)
    *H04L 67/10* (2022.01)

(52) U.S. Cl.
    CPC ............ *H04L 67/561* (2022.05); *H04L 67/10* (2013.01)

(58) Field of Classification Search
    None
    See application file for complete search history.

(56) References Cited

U.S. PATENT DOCUMENTS

| | | | |
|---|---|---|---|
| 7,948,986 B1 * | 5/2011 | Ghosh | H04L 45/50 370/392 |
| 2018/0173795 A1 * | 6/2018 | Cobbett | G06F 16/316 |
| 2023/0033059 A1 * | 2/2023 | Zhu | G06F 16/278 |

* cited by examiner

*Primary Examiner* — Quang N Nguyen
(74) *Attorney, Agent, or Firm* — Sterne, Kessler, Goldstein & Fox P.L.L.C.

(57) ABSTRACT

Disclosed herein are system, method, and computer program product embodiments for compressing metadata in a Software-as-a-Service (SaaS) system. A metadata compression service operating on a computing device detects one or more global properties in entity metadata of each tenant in a plurality of tenants. The metadata compression service partitions the plurality of tenants into one or more groups and identifies common properties in each group. The metadata compression service compiles the one or more global properties in a global-level list and the one or more common properties for each group in a group-level list. The metadata compression service obtains one or more tenant-specific properties in the entity metadata of each tenant in the plurality of tenants and defines a data structure of an entity object for the tenant using the global-level list, the group-level list for the group that contains the tenant, and the one or more tenant-specific properties.

20 Claims, 12 Drawing Sheets

```
<Entity name="EntityA">
    <Property name="prop1" type="String" required="true" creatable="true" updatable="true" visible="true" sortable="true" filterable="true" label="Property 1" ...(more attribute)... />
    <Property name="prop2" type ="String" required="true" creatable="true" updatable="true" visible="true" sortable=" true" filterable="true" maxLength="255" label=" Property 2" ... />
    <Property name="prop3" type ="Long" required="true" creatable="true" updatable="true" visible="true" sortable=" true" filterable=" true" label=" Property 3" ... />
    <Property name="prop4" type ="Double" required="true" creatable="true" updatable="true" visible="true" sortable=" true" filterable="true" label=" Property 4" ... />
    <Property name="prop5" type="Date" required="true" creatable="true" updatable="true" visible="true" sortable=" true" filterable="true" label=" Property 5" ... />
    ...
    <Property name="prop45" type="DateTime" required=" true" creatable="true" updatable="true" visible="true" sortable="false" filterable=" true" label=" Property 45" ... />
    <Property name="prop46" type="Byte" required="true" creatable="true" updatable="true" visible="true" sortable="false" filterable="true" label=" Property 46" ... />
    <Property name="prop61" type="Blob" required="true" creatable="true" updatable="true" visible="true" sortable="false" filterable="true" label=" Property 61" ... />
    <Property name="prop62" type="String" required="false" creatable="false" updatable="true" visible="true" sortable="false" filterable="false" maxLength="100" label=" Property 62" ... />
    ......
    <Property name="prop69" type="Int" required="false" creatable="false" updatable="true" visible="true" sortable="false" filterable="false" label=" Property 69" ... />
    <Property name="prop70" type="Blob" required="false" creatable="false" updatable="true" visible="true" sortable="false" filterable="false" label=" Property 70" ... />
    ...
</Entity>
```

FIG. 2A

```
<Entity name="EntityA">
    <Property name="prop1" type="String" required="true" creatable="true" updatable="true" visible="true" sortable="true" filterable="true" label="Property 1"   ...(more attribute)... />
    <Property name="prop2" type ="String" required="true" creatable="true" updatable="true" visible="true" sortable=" true" filterable="true" maxLength="255" label=" Property 2"   ... />
    <Property name="prop3" type ="Long" required="true" creatable="true" updatable="true" visible="true" sortable=" true" filterable="true" label=" Property 3"   ... />
    <Property name="prop4" type ="Double" required="true" creatable="false" updatable="true" visible="true" sortable=" true" filterable=" true" label=" Property 4"   ... />
    <Property name="prop5" type="Date" required="false" creatable="true" updatable="true" visible="true" sortable=" true" filterable="true" label=" Property 5"   ... />
    ...
    <Property name="prop45" type="DateTime" required=" true" creatable="true" updatable="true" visible="true" sortable="false" filterable=" true" label=" Property 45"   ... />
    <Property name="prop46" type="Byte" required="true" creatable="true" updatable="true" visible="true" sortable="false" filterable="true" label=" Property 46"   ... />
    <Property name="prop71" type="Float"  required="true" creatable="true" updatable="true" visible="true" sortable="false" filterable="true" label=" Property 71"   ... />
    <Property name="prop72" type="Time" required="false" creatable="false" updatable="true" visible="true" sortable="false" filterable="false" label=" Property 72"   ... />
    ...
    <Property name="prop79" type="Double" required="false" creatable="false" updatable="true" visible="true" sortable="false" filterable="false" label=" Property 79"   ... />
    <Property name="prop80" type="Int" required="false" creatable="false" updatable="true" visible="true" sortable="false" filterable="false" label=" Property 80"   ... />
    ...
</Entity>
```

FIG. 2B

| Tenant | Properties |
|---|---|
| t1 | p10, p11, p13, p15, p16, p17, p19, p20, p22, p23, p25, p26, p27, p28, p29, p30, p31, p34, p35 |
| t2 | p10, p11, p12, p13, p14, p16, p20, p22, p23, p24, p25, p26, p28, p29, p31, p32, p33, p34, p35 |
| t3 | p10, p11, p15, p19, p20, p21, p22, p23, p24, p25, p26, p27, p28, p29, p30, p31, p32, p34, p35 |
| t4 | p11, p12, p13, p14, p15, p16, p20, p21, p22, p23, p25, p26, p27, p28, p29, p30, p31, p33, p34, p35 |
| t5 | p10, p11, p12, p13, p14, p15, p17, p19, p20, p21, p22, p23, p24, p25, p27, p28, p29, p31, p33, p36 |
| t6 | p10, p11, p12, p13, p15, p16, p17, p20, p21, p22, p23, p25, p26, p27, p28, p29, p31, p33, p34, p36 |
| t7 | p10, p11, p14, p15, p16, p17, p20, p21, p22, p23, p24, p25, p26, p27, p28, p29, p30, p31, p32, p34, p35 |
| t8 | p10, p11, p12, p13, p14, p15, p16, p19, p20, p21, p22, p23, p24, p25, p26, p27, p28, p30, p33, p36 |
| t9 | p11, p12, p13, p14, p15, p16, p17, p19, p20, p20, p23, p24, p25, p28, p29, p30, p31, p33, p34, p35 |
| t10 | p10, p12, p16, p17, p19, p20, p21, p22, p23, p24, p25, p26, p27, p28, p29, p30, p31, p32, p33, p36 |
| t11 | p10, p11, p12, p14, p15, p16, p17, p19, p20, p21, p22, p23, p24, p26, p27, p29, p30, p31, p32, p34, p37 |
| t12 | p10, p11, p12, p13, p14, p15, p17, p19, p21, p22, p23, p24, p25, p27, p28, p30, p32, p33, p34, p37 |
| t13 | p11, p13, p14, p15, p17, p19, p20, p21, p22, p23, p24, p25, p26, p28, p30, p31, p32, p34, p37 |
| t14 | p10, p11, p13, p16, p19, p20, p21, p22, p23, p24, p25, p27, p28, p29, p30, p31, p32, p34, p35 |
| t15 | p10, p12, p13, p14, p15, p17, p20, p21, p22, p23, p24, p25, p26, p28, p29, p30, p31, p33, p34, p36 |
| t16 | p10, p11, p12, p13, p14, p14, p15, p17, p19, p20, p21, p22, p23, p24, p25, p26, p28, p29, p30, p31, p32, p34, p35 |
| t17 | p10, p11, p12, p13, p14, p16, p17, p19, p20, p21, p22, p23, p24, p25, p26, p27, p29, p30, p31, p32, p34, p35 |
| t18 | p10, p11, p12, p13, p14, p15, p17, p19, p20, p21, p22, p23, p24, p25, p26, p28, p29, p31, p33, p34, p36 |
| t19 | p10, p11, p12, p13, p14, p15, p17, p21, p22, p23, p24, p25, p26, p27, p28, p30, p31, p32, p33, p37 |
| t20 | p10, p11, p12, p14, p15, p16, p17, p20, p21, p22, p23, p24, p25, p27, p28, p29, p30, p31, p32, p34, p35 |

FIG. 5

| Group | Tenants | Common properties |
|---|---|---|
| 1 | t1, t2, t3, t4, t7, t9, t14, t17, t20 | p11, p20, p23, p25, p29, p30, p31, p34, p35 |
| 2 | t5, t6, t8, t10, t15, t18 | p10, p12, p20, p21, p22, p23, p25, p28, p33, p36 |
| 3 | t11, t12, t13, t16, t19 | p11, p14, p15, p17, p21, p27, p30, p32, p37 |

FIG. 6

| Group | Tenants | Common properties |
|---|---|---|
| 1 | t10, t8 | p10, p12, p16, p19, p20, p21, p22, p23, p24, p25, p26, p27, p28, p30, p33, p36 |
| 2 | t13, t11 | p11, p14, p15, p17, p19, p20, p21, p24, p26, p27, p30, p31, p32, p33, p34, p37 |
| 3 | t16, t9 | p11, p12, p13, p14, p15, p17, p19, p20, p25, p28, p29, p30, p31, p32 |
| 4 | t17, t2, t4, t1 | p11, p13, p16, p20, p23, p25, p26, p29, p30, p31, p34, p35 |
| 5 | t18, t15, t6, t5 | p10, p12, p13, p15, p17, p20, p21, p22, p23, p25, p28, p31, p33, p36 |
| 6 | t19, t12 | p10, p11, p12, p13, p14, p15, p17, p21, p22, p23, p24, p25, p27, p28, p30, p32, p33, p37 |
| 7 | t20, t7, t14, t3 | p10, p11, p20, p21, p22, p23, p24, p25, p27, p28, p29, p30, p31, p32, p34, p35 |

FIG. 8

| Field | tenant₁ | tenant₂ | tenant₅ | tenant₆ |
|---|---|---|---|---|
| group | 1 | 1 | 2 | 2 |
| globalProps | (all tenants share the same content) {name:prop_global1, type:Int, required:true, creatable: true...}, {name:prop_global2, type:String, required:true, creatable: true...}, {name:prop_global3, type:Long, required:true, creatable: true...}, {name:prop_global4, type:Double, required:true, creatable: true...}, {name:prop_global5, type:Date, required:true, creatable: true...}, .... | | | |
| groupProps | (tenants in group 1 share the same content) {name:prop_group1_1, type:Int, required:true...}, {name:prop_group1_2, type:Long, required:true...}, {name:prop_group1_3, type:String, required:true...}, ... | | (tenants in group 2 share the same content) {name:prop_group2_1, type:Float, required:true...}, {name:prop_group2_2, type:Int, required:true...}, {name:prop_group2_3, type:Date, required:true...}, ... | |
| tenantProps | {name:prop₈₁, type:Int, required:true...}, { name:prop₈₅, type:Double, required:true...}, ... | {name:prop₈₃, type:Int, required:true...}, { name:prop₈₇, type:Int, required:true...}, ... | {name:prop₈₅, type:Date, required:true...}, { name:prop₈₉, type:Time, required:true...}, ... | {name:prop₈₇, type:Int, required:true...}, { name:prop₉₁, type:String, required:true...}, ... |

FIG. 10

METADATA COMPRESSION FOR A SAAS SYSTEM

BACKGROUND

Software-as-a-Service (SaaS) is a cloud-based method for providing software to various users and clients. SaaS-based applications and services may be accessed by a user via the Internet and executed on cloud servers. Given the reduced costs of deploying and maintaining SaaS-based applications, many businesses have since opted to implement one or more component(s) of their systems or services using a cloud service provider. Most SaaS system are capable of hosting entity objects, such as application programming interfaces (APIs) and web services, from multiple tenants. Since every tenant of a SaaS system relies on a unique data model, different tenants may have different metadata for entity objects that perform the same or similar function.

Metadata is essential in SaaS systems. In addition to describing the data structure of an entity object to the client side, the metadata helps SaaS systems to process invocation of the entity object. SaaS systems need to store the metadata of every tenant's entity objects in a cache memory. Caches are often implemented using random access memory (RAM) or other memory devices that can be accessed quickly as opposed to disk-based storage or other storage that takes longer to access. Many systems typically have a limited amount of cache memory because RAM is much more costly than disk-based storage. The cost of storing every tenant's metadata in cache memory is not insignificant. As the tenant count increases, the size of the metadata of entity objects to be stored increases linearly. Complex SaaS systems may support multiple tenants and host dozens of entity objects for each tenant, where each entity object may contain dozens to hundreds of properties. In such scenarios, the overall size of the tenants' metadata may reach dozens to hundreds of millions of bytes. Inadequate cache memory may delay invocation of an entity object and/or severely degrade system performance.

BRIEF DESCRIPTION OF THE DRAWINGS

The accompanying drawings are incorporated herein and form a part of the specification.

FIGS. 2A-2B illustrate a block diagram of metadata fragments of an entity object, according to some embodiments.

FIG. 5 illustrates a table of an example plurality of tenants having an entity of the same type or function, according to some embodiments.

FIG. 6 illustrates a table of the example plurality of tenants partitioned into groups generated by the first example method for partitioning a plurality of tenants into one or more groups, according to some embodiments.

FIG. 8 illustrates a table of the example plurality of tenants partitioned into groups generated by the second example method for partitioning a plurality of tenants into one or more groups, according to some embodiments.

FIG. 10 illustrates an example data structure for an entity object generated by the method for compressing metadata of entity objects in a SaaS system, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for compressing metadata of entity objects in a SaaS system.

Figure 1:
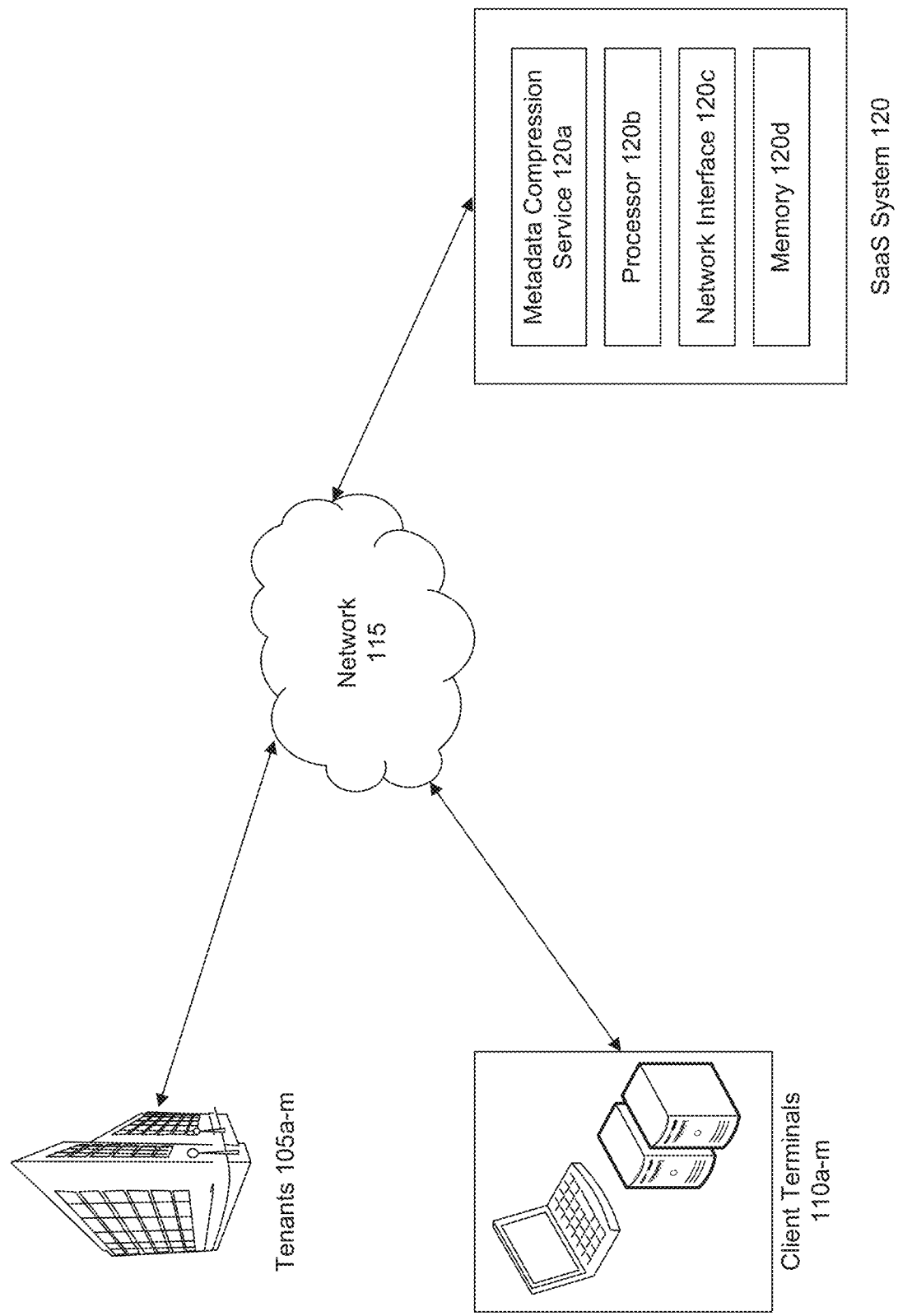
FIG. 1 illustrates a block diagram of a metadata compression system to compress metadata of an entity object, according to some embodiments.

FIG. 1 illustrates a block diagram of an exemplary environment 100 for compressing metadata of entity objects in SaaS system, according to some embodiments. As shown in FIG. 1, the environment 100 may include tenants 105a-m, client terminals 110a-m, network 115, and SaaS system 120.

In some embodiments, the tenants 105a-m are customers of the SaaS system 120. Tenants 105a-m may include any business or organization that has developed at least one entity object (e.g., API, web service, or other software application) and hosts the entity object(s) on the SaaS system.

In some embodiments, client terminals 110a-m may include one or more workstations used by clients (e.g., personal and corporate tenant customers, other components of a tenant system, etc.) to remotely access an entity object hosted by SaaS system 120. The one or more workstations may be a server, a desktop computer, laptop computer, tablet computer, smartphone, cellular telephone, personal digital assistant, or any other type of computing device. The one or more workstations may further include software applications such as a web browser application to enable users to access websites and resources located on remote servers.

In some embodiments, network 115 may include one or more wired or wireless networks. For example, the network 150 may include a cellular network (e.g., a long-term evolution (LTE) network, a code division multiple access (CDMA) network, a 3G network, a 4G network, a 5G network, another type of next generation network, etc.). The network 150 may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

In some embodiments, SaaS system 120 may be one or more server devices (e.g., host servers, cloud servers, web servers, application servers, etc.) that are configured to host entity object(s) obtained from a plurality of tenants (e.g., tenants 105a-m). The one or more server devices may also be configured to provide client terminals (e.g., client terminals 110a-m) remote access an entity object hosted by SaaS system 120. Each of the one or more server devices may further include a metadata compression service 120a, a processor 120b, a network interface 120c, and a memory 120d. The metadata compression service 120a may include a software application comprising a set of instructions, that when executed by a processor 120b, perform a method for compressing the metadata of entity objects hosted by the SaaS system as described in FIGS. 3, 4, and 7. The processor 120b may include one or more central processing units (CPUs) or one or more graphics processing units (GPUs). The network interface 120c may include any communication device configured to enable the SaaS system 120 to receive entity object(s) from tenant(s) 105a-m and provide remote access to the entity object(s) hosted by the SaaS system 120. Memory 120d may include a cache configured to store compressed data structures of entity objects generated by the metadata compression service 120a. In some embodiments, cache memory may be implemented using random access memory (RAM) or other memory devices that can be quickly accessed by SaaS system 120.

FIGS. 2A-2B illustrate metadata fragments of an entity object, Entity A, for Tenant 1 and Tenant 2, according to some embodiments. Entity objects are defined using metadata comprising dozens, and sometimes hundreds, of properties or attributes that aid SaaS systems to process the invocation of the entity objects. SaaS system 120 may host entity objects that perform the same or similar function from multiple tenants. Since every tenant of the SaaS system 120 may rely on a unique data model, the entity objects may have different metadata. For example, FIG. 2A displays the metadata fragment defining the entity object, Entity A, for Tenant 1, and FIG. 2B displays the metadata fragment defining the same entity object for Tenant 2. The underlined part in each figure displays the differences between the metadata of the entity objects for Tenants 1 and 2. However, the figures also demonstrate there may be significant overlap or similarities between the metadata fragments for Tenants 1 and 2. As will be discussed in detail below, the metadata compression service 120a may identify and exploit these similarities in order to generate compressed data structures of entity objects hosted by SaaS system 120.

Figure 3:
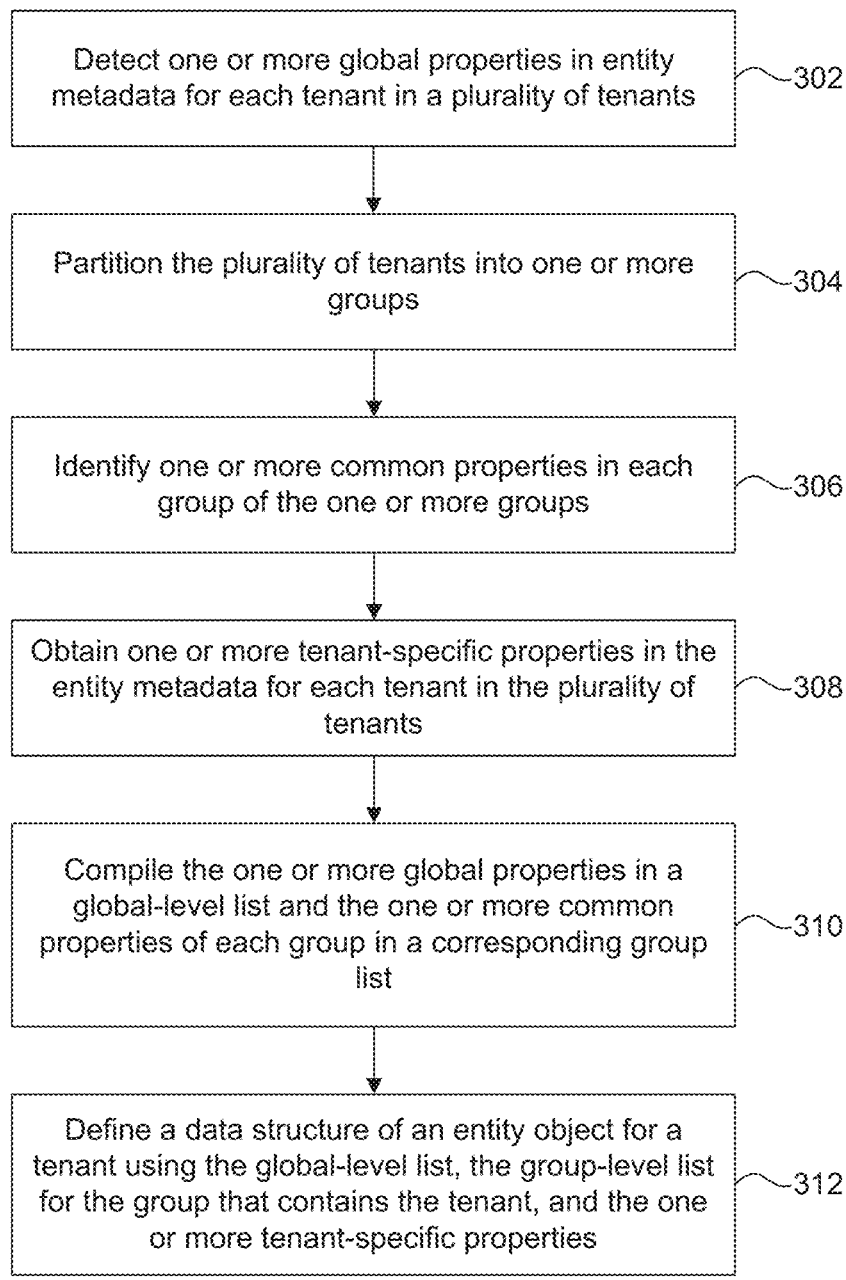
FIG. 3 illustrates a flow diagram of an example method for compressing metadata of entity objects in a SaaS system, according to some embodiments.

FIG. 3 is a flow diagram of an example method for compressing metadata of entity objects in a SaaS system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Furthermore, some of the steps may be performed simultaneously, or in a different order than the one shown in FIG. 3, as will be understood by a person of ordinary skill in the art. Method 300 shall be described with reference to FIG. 1. However, method 300 is not limited to that embodiment.

At 302, the metadata compression service 120a detects one or more global properties in entity metadata for each tenant in a plurality of tenants. The metadata compression service 120a may initially identify a plurality of tenants from among a broader group of tenants supported by the SaaS system 120 that have the same type of entity objects or that have entity objects that perform similar functions. The metadata compression service 120a may identify the same type of entity objects or entity objects that perform the same function by examining the title or description of entity objects hosted by the SaaS system 120. Once the plurality of tenants and associated entity objects have been identified, the metadata compression service 120a detects one or more properties in the data structure of entity objects that are shared by all tenants in the plurality of tenants. In some embodiments, the metadata service 102a may identify a property in the data structure of a first entity object belonging to a first tenant and determine if that property exists in the data structure of an entity object belonging to each of the remaining tenants in the plurality of tenants. Properties that are shared by all tenants in the plurality of tenants are deemed to be global properties.

At 304, the metadata compression service 120a partitions the plurality of tenants into one or more groups. The metadata compression service 120a may exclude the one or more global properties identified at operation 302 from the set of properties in the data structure of the entity object belonging to each tenant in the plurality of tenants. The metadata compression service 120a may further select a group (e.g., an initial group, one or more other existing groups, or a newly created group) that maximizes an average number of common properties (i.e., non-global properties that are shared by all tenants in the group) for all groups. The method for partitioning a plurality of tenants into one or more groups is further described at FIG. 4.

At 306, the metadata compression service 120a identifies one or more common properties in each group of the one or more groups determined at operation 304. As mentioned earlier, common properties in a group may include non-global properties that are shared by all tenants in the group.

At 308, the metadata compression service 120a obtains one or more tenant-specific properties in the entity metadata for each tenant in the plurality of tenants. The metadata compression service 120a may exclude the one or more global properties identified at operation 302 and the one or more common properties identified at operation 306 from the set of properties in the data structure of the entity object belonging to each tenant in the plurality of tenants. The metadata compression service 120a may further obtain the one or more tenant-specific properties for each tenant by identifying any properties that remain in the set of properties in the data structure of the entity object after the one or more global properties and the one or more common properties have been excluded.

At 310, the metadata compression service 120a may compile the one or more global properties in a global-level list. The metadata compression service 120a may further define a default value for each global property in the global-level list to a value that a majority of tenants in the plurality of tenants have defined for that property. The metadata compression service 120a may also compile the one or more common properties in a corresponding group-level list for each group of the one or more groups. For each of the one or more common properties in a group-level list, the metadata compression service 120a may define a default value for the property using a value that a majority of tenants in the group have defined for that property. In some embodiments, the default values of global properties and common properties are unalterable and cannot be changed by any tenant once they are set by the metadata compression service 120a. In some embodiments, the metadata compression service 120a may store the global-level list and the group-list for each of the one or more groups in memory 120d of the SaaS system.

At 312, the metadata compression service 120a defines a new data structure of an entity object for a tenant using the global-level list, the group-level list for the group that contains the tenant, and the one or more tenant-specific properties for the tenant previously identified at operation 308. The metadata compression service 120a may additionally store the now-defined new data structure of the entity object in memory 120d of the SaaS system. The method for creating a new data structure of an entity object for a tenant is described in further detail in FIG. 9.

Figure 4:
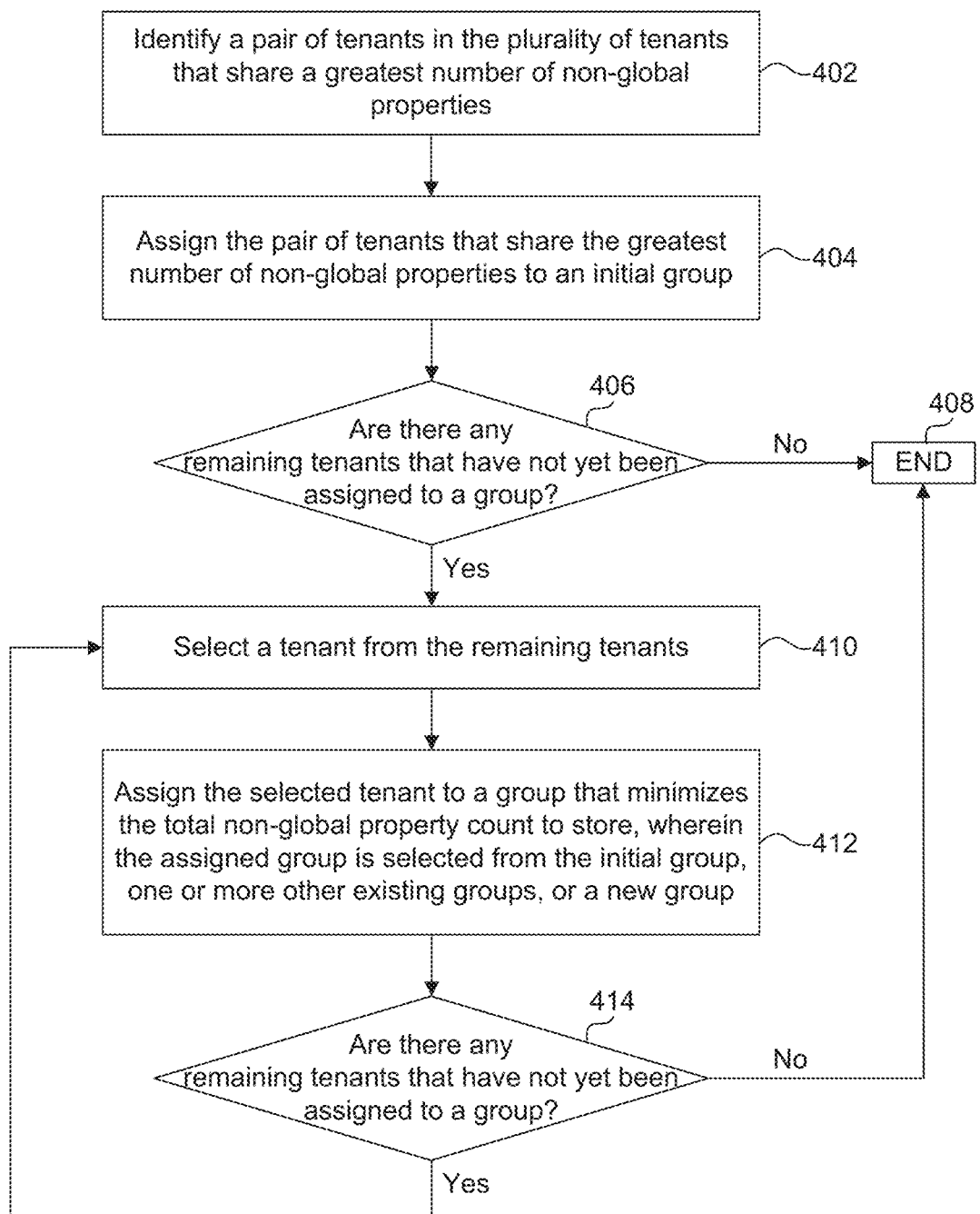
FIG. 4 illustrates a flow diagram of a first example method for partitioning a plurality of tenants into one or more groups, according to some embodiments.

FIG. 4 illustrates a flow diagram of a first example method for partitioning the plurality of tenants into one or more groups, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Furthermore, some of the steps may be performed simultaneously, or in a different order than the one shown in FIG. 4, as will be understood by a person of ordinary skill in the art. Method 400 shall be described with reference to FIG. 1. However, method 400 is not limited to that embodiment.

At 402, the metadata compression service 120a identifies a pair of tenants in the plurality of tenants that share a greatest number of non-global properties. The metadata compression service 120a may exclude one or more identified global properties from the set of properties in the data structure of the entity object belonging to each tenant in the plurality of tenants. Afterwards, the metadata compression service 120a may determine every unique pair of tenants in the plurality of tenants. The number of unique pairs in a set of P tenants may be calculated as follows:

$$\frac{P*(P-1)}{2} \quad \text{(Eq. 1)}$$

For each unique pair of tenants identified in the set of tenants, the metadata compression service 120a may count the number of non-global properties shared by the two tenants. Afterwards, the metadata compression service 120a may identify the pair of tenants that share the largest number of non-global properties.

At 404, the metadata compression service 120a assigns the pair of tenants that share the greatest number of non-global properties to an initial group.

At 406, the metadata compression service 120a may determine if there are any tenants remaining in the plurality of tenants that have not been assigned to a group. If not, method 400 proceeds to operation 408, where the method 400 will terminate. If yes, the method 400 may include proceeding to operation 410.

At 410, the metadata compression service 120a may select one of the remaining tenants that have yet to be assigned to a group.

At 412, the metadata compression service 120a may assign the selected tenant to a group that minimizes a "total non-global property count to store" value (i.e., the number of non-global properties that are to be stored in memory 120d of the SaaS system by the metadata compression service 120a.). A total non-global property count to store value may be calculated as follows:

$$\text{total} = (C_1 + C_2 + \ldots + C_K) + \quad \text{(Eq. 2)}$$
$$[(X_1 - C_{f(1)}) + (X_2 - C_{f(2)}) + \ldots + (X_N - C_{f(N)})] =$$
$$\sum_{i=1}^{K} C_i + \sum_{i=1}^{N} (X_i - C_{f(i)})$$

Where $C_1$ is the number of common properties (i.e., non-global properties shared by all tenants in a group) in Group 1, $C_2$ is the number of common properties in Group 2, and $C_K$ is the number of common properties in Group K; $X_1$ is the number of non-global properties that tenant t1 has, $X_2$ is the number of non-global properties that tenant t2 has, and $X_N$ is the number of non-global properties that tenant tN has; $C_{f(1)}$ is the number of common properties in the group that contains tenant t1, $C_{f(2)}$ is the number of common properties in the group that contains tenant t2, and $C_{f(N)}$ is the number of common properties in the group that contains tenant tN. The metadata compression service 120a may calculate the total non-global property count to store when the selected tenant is added to the initial group, the total non-global property count to store when the selected tenant is added to each of the one or more existing groups, and the total non-global property count to store when the selected tenant is added to a new group. Afterwards, the metadata compression service 120a may assign the selected tenant to the group that minimizes the total non-global property count to store.

At 414, the metadata compression service 120a may determine if there are any tenants remaining in the plurality of tenants that have not been assigned to a group. If yes, the method 400 may include selecting another tenant and repeating operations 412 and 414. If not, method 400 may include proceeding to operation 408, where the method 400 will terminate.

FIGS. 5 and 6 provide an example scenario that further illustrates key aspects of applying method 400 to partition a plurality of tenants into one or more groups. FIG. 5 illustrates a table of an example plurality of tenants having an entity object of the same type or function. FIG. 6 illustrates the result of applying method 400 to the plurality of tenants shown in the table in FIG. 5.

The table in FIG. 5 displays an example plurality of tenants comprising 20 tenants (e.g., t1 to t20) and the non-global properties of the entity object for each tenant. By way of example, and not limitation, method 400 may be applied to the plurality of tenants shown in the table in FIG. 5. As previously discussed, operation 402 of method 400 may entail the metadata compression service 120a identifying a pair of tenants in the plurality of tenants that share the greatest number of non-global properties. From the set of 20 tenants in the first table of FIG. 5, the metadata compression service 120a may initially determine 190 possible unique pairs. Furthermore, the metadata compression service 120a may calculate the number of non-global properties shared by the two tenants in each pair and identify the pair with the greatest number of non-global properties shared between the two tenants. From the table in FIG. 5, the metadata compression service 120a may determine that the pair comprising tenants t1 and t14 share 17 out of 20 possible non-global properties between each other. Based on this finding, the metadata compression service 120a may identify t1 and t14 as the tenants that share the greatest number of non-global properties.

Next, as part of operation 404 of method 400, the metadata compression service 120a may assign tenants t1 and t14 to an initial group (e.g., "Group 1").

Next, as part of operation 406 of method 400, the metadata compression service 120a may determine if there are other tenants in the plurality of tenants that have not been assigned to a group.

After the assignment of tenants t1 and t14 to Group 1, there are 18 tenants remaining in the table of FIG. 5 that have not been assigned to a group. Thus, as part of operation 410 of method 400, the metadata compression service 120a may select the next tenant from the remaining 18 tenants according to numerical order, alphabetical order, or any other criteria known to one of ordinary skill in the art. In this example, the metadata compression service 120a may select tenant t2 as the next tenant for group assignment.

Next, as part of operation 412 of method 400, metadata compression service 120a may assign tenant t2 to a group that minimizes the total non-global property count to store. For example, the metadata compression service 120a may assign tenant t2 to Group 1 or create a new group based on which group results in the smallest total non-global property count to store. In this example, the metadata compression service 120a may calculate the total non-global property count to store when tenant t2 is assigned to Group 1 and the total non-global property count to store when tenant t2 is assigned to a new group using the formula in Eq. 2. When tenant t2 is assigned to Group 1, the metadata compression service 120a may determine that Group 1 has 14 common properties shared between tenants t1, t2, and t14. The metadata compression service 120a may further determine that the total non-global property count to store in this scenario is 372 according to the formula in Eq. 2. When tenant t2 is assigned to a newly created group, the metadata compression service 120a may determine that Group 1 contains 17 common properties shared between tenants t1 and t14 and the newly created group containing tenant t2 (e.g., Group 2) contains 20 common properties. The metadata compression service 120a may additionally determine that the total non-global property count to store in this scenario is 383 according to the formula in Eq. 2. Thus, the metadata compression service 120a may accordingly assign tenant t2 to Group 1 because doing so results in the smallest total non-global property count to store.

Next, as part of operation 414 of method 400, the metadata compression service 120a may again determine if there are other tenants in the plurality of tenants that have not been assigned to a group. If yes, the metadata compression service 120a may select another tenant from the remaining tenants and assign the selected tenant to a group that minimizes the total non-global property count to store. For example, after tenants t3, t4, t7, and t9 have been assigned to Group 1 and tenants t5, t6, t8, and t10 have been assigned to Group 2, the metadata compression service 120a may select tenant t11 from the remaining nine tenants as the next tenant for group assignment.

Next, as part of operation 412 of method 400, the metadata compression service 120a may determine whether to assign tenant t11 to the initial group (e.g., Group 1), one of one or more other existing groups (e.g., Group 2), or a new group (e.g., Group 3). As displayed in FIG. 6, Group 1 may contain tenants t1, t2, t3, t4, t7, t9, and t14, and Group 2 may contain tenants t5, t6, t8, and t10. In this example, the metadata compression service 120a may calculate the total non-global property count to store when tenant t11 is assigned to Group 1, the total non-global property count to store when tenant t11 is assigned to Group 2, and the total non-global property count to store when tenant t11 is assigned to a new group using the formula in Eq. 2. When tenant t11 is assigned to Group 1, the metadata compression service 120a may determine that Group 1 has six common properties shared among tenants t1, t2, t3, t4, t7, t9, t11, and t14 and that Group 2 has 11 common properties shared among tenants t5, t6, t8, and t10. The metadata compression service 120a may also determine that the non-global property count to store in this scenario is 325. When tenant t11 is assigned to Group 2, the metadata compression service 120a may determine that Group 1 has 10 common properties shared among tenants t1, t2, t3, t4, t7, t9, and t14 and that Group 2 has six common properties shared among tenants t5, t6, t8, t10, and t11. The metadata compression service 120a may determine that the non-global property count to store in this scenario is 316. When tenant t11 is assigned to a newly created group ("Group 3"), the metadata compression service 120a may determine that Group 1 has 10 common properties shared among tenants t1, t2, t3, t4, t7, t9, and t14 and that Group 2 has 11 common properties shared among tenants t5, t6, t8, and t10. The metadata compression service 120a may further determine that Group 3 has 20 common properties given that the group only contains tenant t11. The metadata compression service 120a may additionally determine that the non-global property count to store in this scenario is 307. Accordingly, in this scenario, the metadata compression service 120a may assign tenant t11 to Group 3 since this option results in the smallest total non-global property count to store. Furthermore, the metadata compression service 120a may repeat operations 410 and 412 of method 400 until all remaining tenants of the plurality of tenants shown in the table in FIG. 5 have been assigned to a group.

FIG. 6 illustrates a table of the example plurality of tenants partitioned into groups according to method 400. As displayed in the table, the 20 tenants are partitioned into Groups 1, 2, and 3. Subsequent to assigning the plurality of tenants to a group, the metadata compression service 120a may identify the common properties in each group. For example, the metadata compression service 120a may identify nine common properties in Group 1 since tenants t1, t2, t3, t4, t7, t9, t14, t17, and t20 in the group share non-global properties: p11, p20, p23, p25, p29, p30, p31, p34, and p35. The metadata compression service 120a may identify 10 common properties in Group 2 because tenants t5, t6, t8, t10, t15, and t18 in the group share non-global properties: p10, p12, p20, p21, p22, p23, p25, p28, p33, and p36. The metadata compression service 120a may further identify nine common properties in Group 3 because tenants t11, t12, t13, t16, and t19 in the group share non-global properties: p11, p14, p15, p17, p21, p27, p30, p32, and p37. Finally, the metadata compression service 120a may determine that the final total non-global property count to store is 242, down from an initial total non-global property count store of 400 at the start of method 400.

Figure 7:
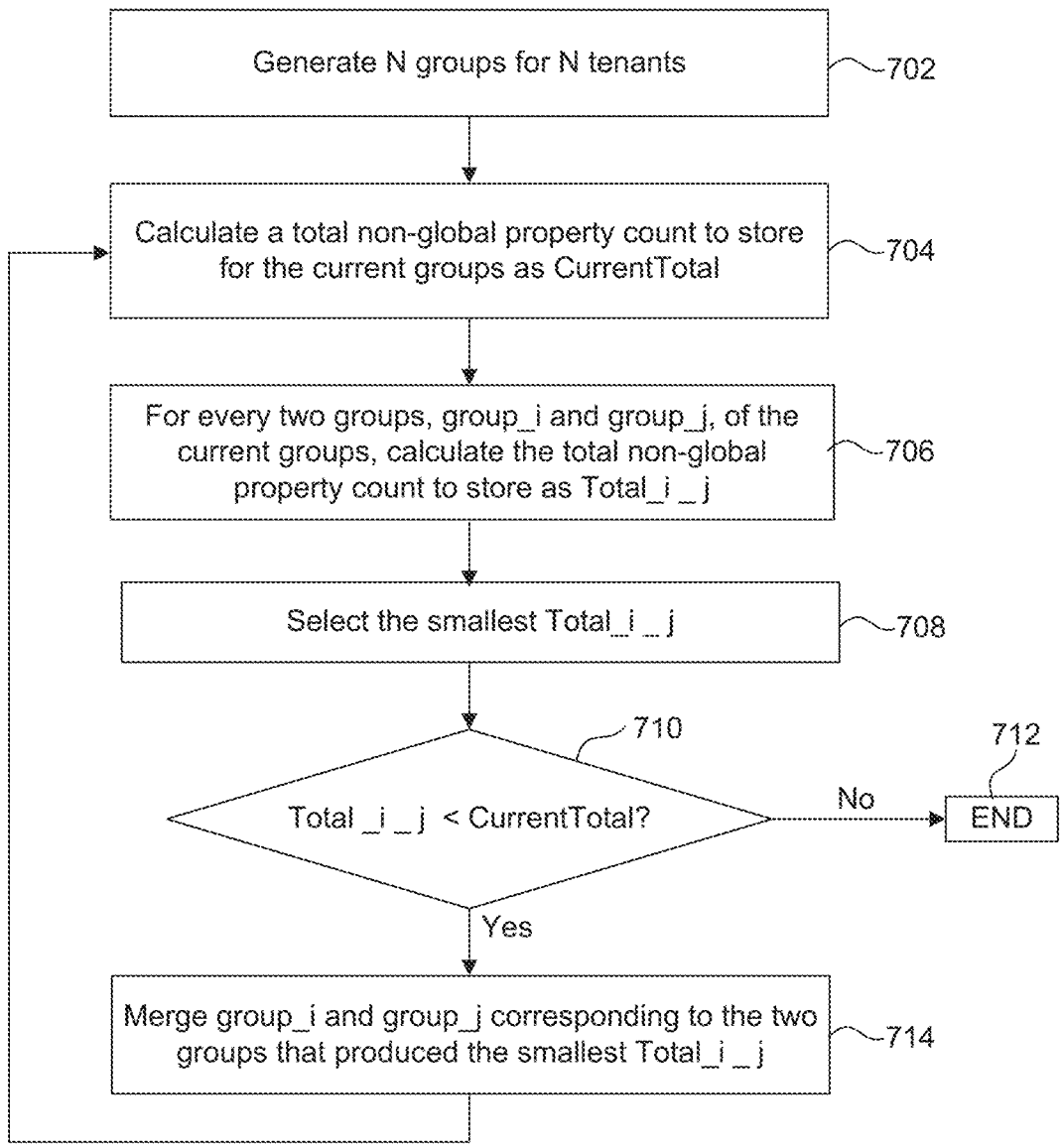
FIG. 7 illustrates a flow diagram of a second example method for partitioning a plurality of tenants into one or more groups, according to some embodiments.

FIG. 7 illustrates a flow diagram of a second example method for partitioning the plurality of tenants into one or more groups, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Furthermore, some of the steps may be performed simultaneously, or in a different order than the one shown in FIG. 7, as will be understood by a person of ordinary skill in the art. Method 700 shall be described with reference to FIGS. 1 and 5. However, method 700 is not limited to that embodiment.

At 702, the metadata compression service 120a generates a group for each tenant in the plurality of tenants and assigns the tenants to their respective groups. Referring back to the plurality of tenants in the table of FIG. 5 as an example scenario, the metadata compression service 120a may generate 20 groups—one group for each of the 20 tenants displayed in the table.

At 704, the metadata compression service 120a calculates a total non-global property count to store for the current groups ("CurrentTotal") according to the formula in Eq. 2. For example, the metadata compression service 120a may determine that the total non-global property count to store for the 20 groups initially generated at operation 702 is 400 and set this value as the "CurrentTotal."

At 706, the metadata compression service 120a calculates a total non-global property count to store ("Total_i_j") for every two groups ("group_i" and "group_j") of the current groups. The metadata compression service 120a may identify all unique pairs of groups of the current groups. The number of unique pairs of groups may be calculated using the formula in Eq. 1. For example, the metadata compression service 120a may determine there are 190 unique pairs of groups that can be identified in the 20 groups generated at operation 702. For each unique pair of groups, the metadata compression service 120a may further identify the non-global properties shared by tenants in the groups of the respective pair of groups and calculate the total non-global property count to store ("Total_i_j") for the respective pair of groups.

At 708, the metadata compression service 120a identifies the pair of groups with the smallest "Total_i_j" value. For instance, in the above example scenario, the metadata compression service 120a may identify the pair comprising the group that includes tenant t10 and the group that includes tenant t8 as the pair with the smallest "Total_i_j" value. In this case, the metadata compression service 120a may identify 16 common properties in the pair because tenants t10 and t8 share non-global properties: p10, p12, p16, p19, p20, p21, p22, p23, p24, p25, p26, p27, p28, p30, p33, and p36. The metadata compression service 120a may additionally determine that the non-global property count to store ("Total_i_j" value) for the pair is 384.

At 710, the metadata compression service 120a determines if the "Total_i_j" value calculated at operation 708 is less than the "CurrentTotal" value calculated at operation 704. If not, the method 700 may include proceeding to operation 712, where the method 700 will terminate. If yes, the method 700 proceeds to operation 714. In the above example scenario, the metadata compression service 120a may proceed to operation 714 upon determining that the "Total_i_j" value of 384 for the pair comprising the group that includes tenant t9 and the group that includes tenant t7 is less than the "CurrentTotal" value of 400.

At 714, the metadata compression service 120a merges the two groups ("group_i" and "group_j") in the pair of groups with the smallest "Total_i_j" value previously identified at operation 708. In the above example scenario, the metadata compression service 120a may combine tenants t10 and t8 into a single group. The method 700 may proceed to operation 704, where the metadata compression service 120a may calculate the total non-global property count store ("CurrentTotal") for the current groups and repeat operations 706, 708, 710, and 714. The method 700 may repeat operations 704, 706, 708, 710, and 714 until the metadata compression service 120a determines that the "Total_i_j" value calculated at operation 708 is greater than the "CurrentTotal" value calculated at operation 704.

FIG. 8 illustrates a table of the example plurality of tenants partitioned into groups according to method 700. The 20 tenants are partitioned into Groups 1-7. After assigning the plurality of tenants to a group, the metadata compression service 120a may identify the common properties in each group. As displayed in the table, the metadata compression service 120a may identify 16 common properties in Group 1 since the assigned tenants t10 and t8 share non-global properties: p10, p12, p16, p19, p20, p21, p22, p23, p24, p25, p26, p27, p28, p30, p33, and p36. Group 2 includes 16 common properties because the assigned tenants t13 and t11 share non-global properties: p11, p14, p15, p17, p19, p20, p21, p24, p26, p27, p30, p31, p32, p33, p34, and p37. Group 3 has 14 common properties because the assigned tenants t16 and t9 share non-global properties: p11, p12, p13, p14, p15, p17, p19, p20, p25, 28, p29, p30, p31, and p32. Group 4 has 12 common properties since the assigned tenants t17, t2, t4, and t1 share non-global properties: p11, p13, p16, p20, p23, p25, p26, p29, p30, p31, p34, and p35. Group 5 includes 14 common properties because the assigned tenants t18, t15, t6, and t5 share non-global properties: p10, p12, p13, p15, p17, p20, p21, p22, p23, p25, p28, p31, p33, and p36. Group 6 includes 18 common properties because the assigned tenants t9 and t12 share non-global properties: p10, p11, p12, p13, p14, p15, p17, p21, p22, p23, p24, p25, p27, p28, p30, p32, p33, and p37. Furthermore, Group 7 contains 16 common properties because the assigned tenants t20, t7, t14, and t3 share non-global properties: p10, p11, p20, p21, p22, p23, p24, p25, p27, p28, p29, p30, p31, p32, p34, and p35. Finally, the metadata compression service 120a may determine that the final total non-global property count to store is 210, down from an initial total non-global property count store of 400 at the start of method 700.

Furthermore, the metadata compression service 120a, at operation 310 of method 300, may compile the one or more global properties in a global-level list previously identified at operation 302 of method 300. The metadata compression service 120a may also compile one or more common properties that are identified in each group of the one or more groups in a corresponding group-level list for that group. For example, for the groups displayed in FIG. 6, the metadata service 120a may compile the common properties in Group 1 in a first group-level list, the common properties in Group 2 in a second group-level list, and the common properties in Group 3 in a third group-level list. The metadata compression service 120a may additionally store the global-level list and the group-list for each of the one or more groups in memory 120d of the SaaS system.

Figure 9:
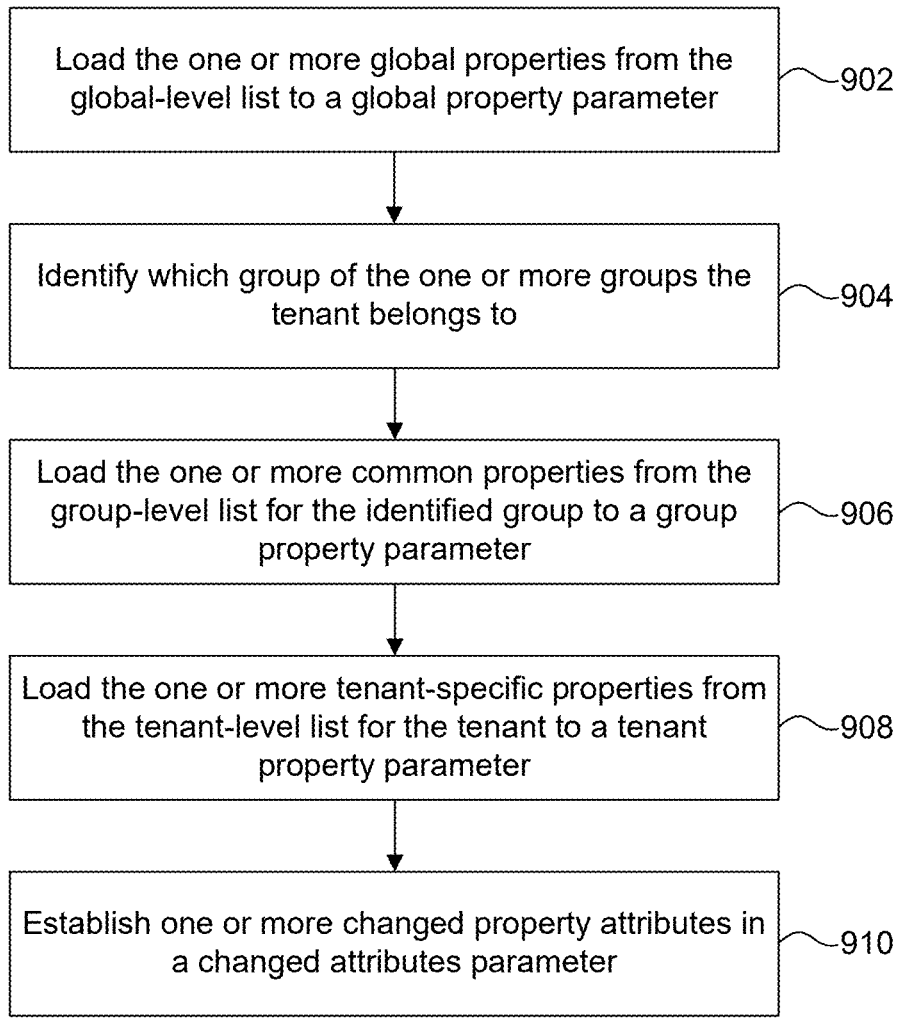
FIG. 9 illustrates a flow diagram of an example method for generating a new data structure for an entity object of a tenant, according to some embodiments.

FIG. 9 illustrates a flow diagram of an example method for defining a new data structure of an entity object for a tenant, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Furthermore, some of the steps may be performed simultaneously, or in a different order than the one shown in FIG. 9, as will be understood by a person of ordinary skill in the art. Method 900 shall be described with reference to FIG. 1. However, method 900 is not limited to that embodiment.

At 902, the metadata compression service 120a may load the one or more global properties in a global-level list to a global property parameter in the new data structure for the entity object. In some embodiments, loading the one or more global properties in a global-level list to a global property parameter may include the messenger compression service 120a populating the global property parameter with the one or more global properties. In some other embodiments, loading the one or more global properties in a global-level list to a global property parameter may include populating the global property parameter with a reference to the global-level list.

At 904, the metadata compression service 120*a* may identify which group of the one or more groups that the tenant belongs to. In some embodiments, the metadata compression service 120*a* may identify the correct group by searching a table or data structure that stores the tenant-group correspondences.

At 906, the metadata compression service 120*a* may retrieve the group-level list for the identified group and load the one or more common properties in that list to a group property parameter in the new data structure for the entity object. In some embodiments, loading the one or more common properties in a group-level list group property parameter may include the messenger compression service 120*a* populating the group property parameter with the one or more common properties in the group-level list for the identified group. In some other embodiments, loading the one or more common properties in a group-level list to a group property parameter may include populating the group property parameter with a reference to the group-level list for the identified group.

At 908, the metadata compression service 120*a* may load one or more tenant-specific properties for the tenant to a tenant property parameter in the new data structure for the entity object. In some embodiments, the one or more tenant-specific properties may include any remaining properties in the original entity object that have not been previously identified as a global property or a common property by the metadata compression service 120*a*. Unlike global properties or common properties, tenant-specific properties are owned by that tenant and can be changed or removed by that tenant at any time.

At 910, the metadata compression service 120*a* may define changed property attribute(s) in a changed attributes parameter in the new data structure for the entity object. As mentioned earlier, a tenant cannot change or remove global properties in a global-level list or common properties in a group-level list. However, in some cases, a tenant may wish to remove one or more global-level or common properties from the entity object. In such cases, the metadata compression service 120*a* may set a special flag ("removed:true") for each of the one or more removed properties in the changed attributes parameter of the new data structure for the entity object. The SaaS system may use the flag(s) to ignore the one or more removed properties when executing the entity object or to adjust the data structure of the entity object during a subsequent execution of the metadata compression method (Method 300 in FIG. 3.). In other cases where a tenant has created a new entity object that excludes a global property or a common property necessary to join a desired group, the metadata compression service 120*a* may set a special flag ("removed:true") for each of the one or more missing properties in the changed attributes parameter of the new data structure for the entity object. The metadata compression service 120(*s*) system may, in these cases, use the flag(s) to add the tenant to the desired group.

FIG. 10 illustrates an example data structure for an entity object generated by the method 300 for compressing metadata of entity objects in a SaaS system, according to some embodiments. The figure displays data structures of the entity object, Entity A, for tenants t1, t2, t5, and t6, which have previously been partitioned into groups as depicted in FIG. 6 by the metadata compression service 120*a*. As displayed in the table of FIG. 10, the data structure of an entity object may be divided into three levels: the global level, the group level, and the tenant level. The global property parameter ("globalProps") in the data structure for each tenant may contain the same global properties and property values. Both tenants t1 and t2 have been assigned to Group 1, and thus the group property parameter ("groupProps") in the data structure for those tenants may contain the same group properties and property values. Similarly, the group property parameter ("groupProps) in the data structure for tenants t5 and t6 may contain the same group properties and property values since the tenants have been assigned to Group 2. The data structure for each tenant may further include a tenant-specific property parameter ("tenantProps") that contains one or more remaining properties that were defined in the original entity object that were not previously identified as being a global property or a common property by the metadata compression service 120*a*. Furthermore, the data structure for each tenant may additionally include a changed attributes parameter ("changedAttrs") containing flag(s) for any global or common properties that the tenant wishes to remove from the entity object. In some embodiments, the changed attributes parameter may contain flag(s) for any global or common properties missing in the definition of the entity object that the tenant may wish to later include.

As demonstrated by FIG. 10, many of the properties in the definition of an entity object may be global properties at the global level or common properties at the group-level that are shared by different tenants. Identifying global properties and common properties in an entity object greatly compresses the metadata size of the entity object and saves memory capacity. Furthermore, as the number of tenants in a SaaS system increases, the metadata size of all entity objects in the SaaS system increases very slowly, and not linearly as with prior known methods and systems for storing entity object metadata.

Figure 11:
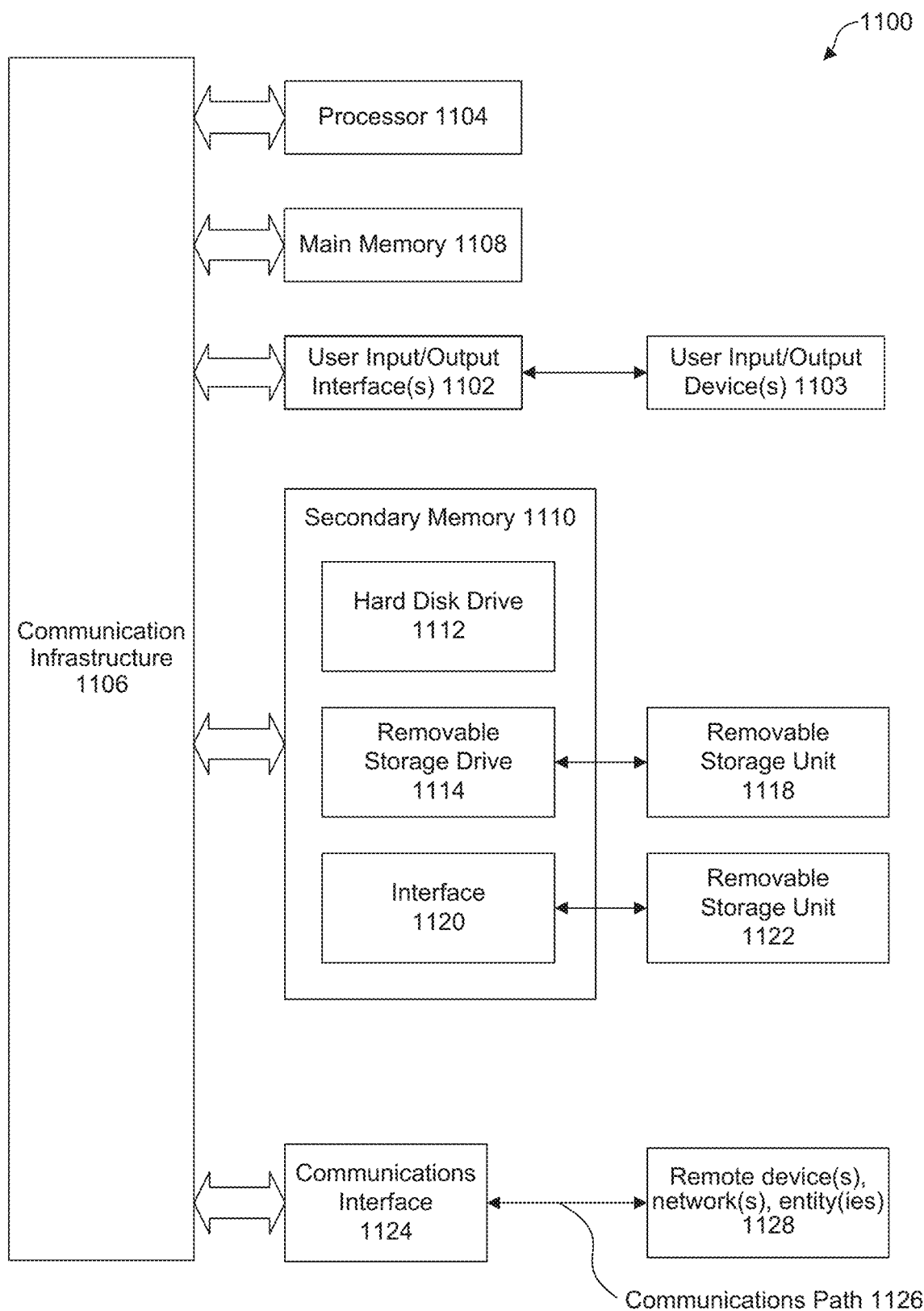
FIG. 11 illustrates an example computer system useful for implementing various embodiments.

Various embodiments may be implemented, for example, using one or more well-known computer systems, such as computer system 1100 shown in FIG. 11. One or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 914 may interact with a removable storage unit 1118. Removable storage unit 918 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 900 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for compressing metadata in a software-as-a-service (SaaS) system, the computer-implemented method comprising:
  detecting one or more global properties in entity metadata for each tenant in a plurality of tenants of the SaaS system, wherein the one or more global properties are properties shared by all tenants in the plurality of tenants;
  partitioning the plurality of tenants into one or more groups;
  identifying one or more common properties in each group of the one or more groups, wherein the one or more common properties include non-global properties shared by all tenants in the group;
  compiling the one or more global properties in a global-level list and the one or more common properties of each group in a corresponding group-level list;
  obtaining one or more tenant-specific properties in the entity metadata for each tenant in the plurality of tenants, wherein the one or more tenant-specific properties exclude the one or more global properties and the one or more common properties; and
  defining a data structure of an entity object for a tenant using the global-level list, the group-level list for the group that contains the tenant, and the one or more tenant-specific properties for the tenant.

2. The computer-implemented method of claim 1, wherein the partitioning further comprises:
  identifying a pair of tenants in the plurality of tenants that share a greatest number of non-global properties;
  assigning the identified pair of tenants to an initial group; and
  determining, for each remaining tenant in the plurality of tenants, whether to assign the tenant to the initial group, one or more other existing groups, or a new group.

3. The computer-implemented method of claim 2, wherein the determining further comprises:
  selecting a group for the tenant that minimizes a total non-global property count to store from the initial group, the one or more existing groups, or the new group.

4. The computer-implemented method of claim 1, further comprising:
  storing the global-level list and the group-level list for each group of the one or more groups in a cache memory of the SaaS system, wherein the global-level list and the group-level list for each group of the one or more groups are modified lists.

5. The computer-implemented method of claim 4, wherein the storing further comprises:
  setting a global default value for each global property in the global-level list, wherein the global default value is a value defined by most tenants of the plurality of tenants for the global property; and
  setting a group default value for each common property in the group-level list for each group of the one or more groups, wherein the group default value is a value defined by most tenants in the group for the common property.

6. The computer-implemented method of claim 1, wherein the defining further comprises:
  identifying which group of the one or more groups the tenant belongs to;
  loading the one or more global properties from the global-level list to a global property parameter in the data structure of the entity object;
  loading the one or more common properties from the group-level list for the identified group to a group property parameter in the data structure of the entity object;
  loading the one or more tenant-specific properties for the tenant to a tenant property parameter in the data structure of the entity object; and
  establishing one or more changed property attributes in a changed attributes parameter in the data structure of the entity object.

7. The computer-implemented method of claim 6, wherein the establishing further comprises:
  identifying at least one property, from the one or more global properties and the one or more common properties for the group that contains the tenant, that the tenant intends to remove from the entity object; and
  setting a flag for the at least one property in the changed attributes parameter.

8. A system for compressing metadata in a software-as-a-service (SaaS) system, comprising:
  at least one processor; and
  a memory storing instructions therein that, when executed by the at least one processor, cause the at least one processor to perform operations comprising:
    detecting one or more global properties in entity metadata for each tenant in a plurality of tenants of the SaaS system, wherein the one or more global properties are properties shared by all tenants in the plurality of tenants;
    partitioning the plurality of tenants into one or more groups;
    identifying one or more common properties in each group of the one or more groups, wherein the one or more common properties include non-global properties shared by all tenants in the group;
    compiling the one or more global properties in a global-level list and the one or more common properties of each group in a corresponding group-level list;
    obtaining one or more tenant-specific properties in the entity metadata for each tenant in the plurality of tenants, wherein the one or more tenant-specific properties exclude the one or more global properties and the one or more common properties; and
    defining a data structure of an entity object for a tenant using the global-level list, the group-level list for the group that contains the tenant, and the one or more tenant-specific properties for the tenant.

9. The system of claim 8, wherein the operations further comprise:
  identifying a pair of tenants in the plurality of tenants that share a greatest number of non-global properties;
  assigning the identified pair of tenants to an initial group; and
  determining, for each remaining tenant in the plurality of tenants, whether to assign the tenant to the initial group, one or more other existing groups, or a new group.

10. The system of claim 9, wherein the operations further comprise:
selecting a group for the tenant that minimizes a total non-global property count to store from the initial group, the one or more existing groups, or the new group.

11. The system of claim 8, further comprising:
storing the global-level list and the group-level list for each group of the one or more groups in a cache memory of the SaaS system, wherein the global-level list and the group-level list for each group of the one or more groups are unmodified lists.

12. The system of claim 11, wherein the storing further comprises:
setting a global default value for each global property in the global-level list, wherein the global default value is a value defined by most tenants of the plurality of tenants for the global property; and
setting a group default value for each common property in the group-level list for each group of the one or more groups, wherein the group default value is a value defined by most tenants in the group for the common property.

13. The system of claim 11, wherein the defining further comprises:
identifying which group of the one or more groups the tenant belongs to;
loading the one or more global properties from the global-level list to a global property parameter in the data structure of the entity object;
loading the one or more common properties from the group-level list for the identified group to a group property parameter in the data structure of the entity object;
loading the one or more tenant-specific properties for the tenant to a tenant property parameter in the data structure of the entity object; and
establishing one or more changed property attributes in a changed attributes parameter in the data structure of the entity object.

14. The system of claim 13, wherein the establishing further comprises:
identifying at least one property, from the one or more global properties and the one or more common properties for the group that contains the tenant, that the tenant intends to remove from the entity object; and
setting a flag for the at least one property in the changed attributes parameter.

15. A non-transitory computer-readable medium having instructions stored thereon that, when executed by at least one computing device, cause the at least one computing device to perform operations comprising:
detecting one or more global properties in entity metadata for each tenant in a plurality of tenants of a software-as-a-service (SaaS) system, wherein the one or more global properties are properties shared by all tenants in the plurality of tenants;
partitioning the plurality of tenants into one or more groups;
identifying one or more common properties in each group of the one or more groups, wherein the one or more common properties include non-global properties shared by all tenants in the group;
compiling the one or more global properties in a global-level list and the one or more common properties of each group in a corresponding group-level list;
obtaining one or more tenant-specific properties in the entity metadata for each tenant in the plurality of tenants, wherein the one or more tenant-specific properties exclude the one or more global properties and the one or more common properties; and
defining a data structure of an entity object for a tenant using the global-level list, the group-level list for the group that contains the tenant, and the one or more tenant-specific properties for the tenant.

16. The non-transitory computer-readable medium of claim 15, wherein the operations further comprise:
identifying a pair of tenants in the plurality of tenants that share a greatest number of non-global properties;
assigning the identified pair of tenants to an initial group; and
determining, for each remaining tenant in the plurality of tenants, whether to assign the tenant to the initial group, one or more other existing groups, or a new group.

17. The non-transitory computer-readable medium of claim 16, wherein the operations further comprise:
selecting a group for the tenant that minimizes a total non-global property count to store from the initial group, the one or more existing groups, or the new group.

18. The non-transitory computer-readable medium of claim 17, wherein the operations further comprise:
storing the global-level list and the group-level list for each group of the one or more groups, in a cache memory of the SaaS system, wherein the global-level list and the group-level list for each group of the one or more groups are unmodified lists.

19. The non-transitory computer-readable medium of claim 18, wherein the storing further comprises:
setting a global default value for each global property in the global-level list, wherein the global default value is a value defined by most tenants of the plurality of tenants for the global property; and
setting a group default value for each common property in the group-level list for each group of the one or more groups, wherein the group default value is a value defined by most tenants in the group for the common property.

20. The non-transitory computer-readable medium of claim 17, wherein the defining further comprises:
identifying which group of the one or more groups the tenant belongs to;
loading the one or more global properties from the global-level list to a global property parameter in the data structure of the entity object;
loading the one or more common properties from the group-level list for the identified group to a group property parameter in the data structure of the entity object;
loading the one or more tenant-specific properties for the tenant to a tenant property parameter in the data structure of the entity object;
identifying at least one property, from the one or more global properties and the one or more common properties for the group that contains the tenant, that the tenant intends to remove from the entity object; and
setting a flag for the at least one property in a changed attributes parameter in the data structure of the entity object.

* * * * *